United States Patent
Nomura et al.

(10) Patent No.: US 10,221,912 B2
(45) Date of Patent: Mar. 5, 2019

(54) PRESSURE DAMPING DEVICE AND ELASTIC MEMBER

(71) Applicant: Showa Corporation, Gyoda-shi (JP)

(72) Inventors: Takeshi Nomura, Gyoda (JP); Akiko Shibasaki, Gyoda (JP)

(73) Assignee: SHOWA CORPORATION, Gyoda-Shi (JP)

( * ) Notice: Subject to any disclaimer, the term of this patent is extended or adjusted under 35 U.S.C. 154(b) by 20 days.

(21) Appl. No.: 15/171,668

(22) Filed: Jun. 2, 2016

(65) Prior Publication Data

US 2016/0356335 A1 Dec. 8, 2016

(30) Foreign Application Priority Data

Jun. 8, 2015 (JP) .................................. 2015-116084

(51) Int. Cl.
*F16F 9/348* (2006.01)
*F16F 9/19* (2006.01)

(52) U.S. Cl.
CPC .............. *F16F 9/3485* (2013.01); *F16F 9/19* (2013.01)

(58) Field of Classification Search
CPC ........ F16F 9/348; F16F 9/3485; F16F 9/3487; F16F 9/3488
See application file for complete search history.

(56) References Cited

U.S. PATENT DOCUMENTS

| | | | | | |
|---|---|---|---|---|---|
| 2,138,513 | A | * | 11/1938 | Rossman | F16F 9/34 137/493 |
| 2,676,676 | A | * | 4/1954 | Strauss | F16F 9/3485 188/320 |
| 3,199,636 | A | * | 8/1965 | Bourcier | F16F 9/3214 137/493 |
| 6,336,536 | B1 | * | 1/2002 | Fenn | F16F 9/3485 188/282.6 |
| 8,083,039 | B2 | * | 12/2011 | Vanbrabant | F16F 9/3488 188/322.14 |
| 8,991,570 | B2 | | 3/2015 | Ashiba et al. | |
| 2006/0170185 | A1 | * | 8/2006 | Takahashi | B62K 25/08 280/276 |
| 2009/0051086 | A1 | | 2/2009 | Baltes | |

(Continued)

FOREIGN PATENT DOCUMENTS

| | | |
|---|---|---|
| JP | 07-041095 U | 7/1995 |
| JP | 2008-248956 A | 10/2008 |
| JP | 2013-029133 A | 2/2013 |

OTHER PUBLICATIONS

Office Action dated Dec. 4, 2018 for the corresponding Japanese Patent Application No. 2015-116084.

*Primary Examiner* — Bradley T King
(74) *Attorney, Agent, or Firm* — Leason Ellis LLP

(57) ABSTRACT

A hydraulic damping device includes a first cylinder that houses oil, a piston rod that moves in an axial direction of the first cylinder, and a piston section that generates a damping force by a movement of the piston rod. The piston section includes a piston body formed with an oil channel through which oil flows, a base valve that opens and closes the oil channel of the piston body, a ring-shaped ring valve that is provided on the base valve, and a preload spring that has a positioning section that extends radially and determines a position of the ring valve in the radial direction.

5 Claims, 11 Drawing Sheets

(56) References Cited

U.S. PATENT DOCUMENTS

2013/0025446 A1\* 1/2013 Ashiba .................. F16F 9/3485
                                                                                 91/418
2015/0034182 A1\* 2/2015 Ashiba .................. F16F 9/3485
                                                                                137/514.7

\* cited by examiner

PRESSURE DAMPING DEVICE AND ELASTIC MEMBER

CROSS-REFERENCE TO RELATED APPLICATION(S)

This application claims priority from Japanese Patent Application No. 2015-116084 filed on Jun. 8, 2015, the entire contents of which are incorporated herein by reference.

BACKGROUND OF THE INVENTION

1. Field of the Invention

The present invention relates to a pressure damping device and an elastic member.

2. Description of the Related Art

Pressure damping devices which generate a damping force using a fluid to perform damping are known. For example, JP-2008-248956-A discloses a technique regarding a pressure damping device provided with a valve structure including: a valve disc on which a port is formed; a leaf valve which is constructed by laminating a plurality of annular leaves and which is laminated on the valve disc with an inner circumferential side as a fixed end to open and close the port; and a biasing member which has a thick-walled outer circumference, which is interposed between the annular leaves, and which imparts an initial deflection to the leaf valve, wherein the biasing member includes a thin-walled, small-diameter inner circumferential ring, a thick-walled outer circumferential ring which has an inner diameter that is larger than an outer diameter of the inner circumferential ring, and at least one thin-walled arm which connects the inner circumferential ring and the outer circumferential ring to each other.

SUMMARY

When an annular member formed in a ring shape is provided, the annular member must be positioned. In this case, for example, the annular member may conceivably be jointed to another member that opposes the annular member. However, for example, there is a risk that the annular member and the other member become disjointed to cause a displacement of the annular member.

An object of the present invention is to stabilize a position of an annular member used in a pressure damping device.

To achieve the object described above, the present invention provides a pressure damping device including: a cylinder that houses a fluid; a rod that has a one side-end housed in the cylinder and the other side-end protruding from an opening of the cylinder and that moves in an axial direction of the cylinder; and a damping force generating unit that generates a damping force by a movement of the rod, wherein the damping force generating unit includes: a flow channel formation section that is formed with a flow channel through which the fluid flows in conjunction with the movement of the rod; an opening/closing member that opens and closes the flow channel in the flow channel formation section; a ring-shaped annular member that is provided on the opening/closing member at an opposite side to a side that opposes the flow channel formation section; and a protruding member that has a positioning section that extends radially and determines a position of the annular member in a radial direction.

According to the present configuration, a position of the annular member can be stabilized by the protruding member extending radially.

In addition, to achieve the object described above, the present invention provides an elastic member provided so as to be opposed to an annular member used in a pressure damping device that generates a damping force in conjunction with a movement of a rod relative to a cylinder, wherein the elastic member includes: an annular section that has a through-hole through which the rod penetrates; a plurality of first protruding sections that are formed so as to radially extend from the annular section; and a second protruding section that is formed so as to radially extend from the annular section and has a shorter protrusion length in a radial direction than the first protruding sections.

According to the present invention, a position of an annular member used in a pressure damping device can be stabilized.

DETAILED DESCRIPTION

Hereinafter, embodiments of the present invention will be described in detail with reference to the accompanying drawings.

First Embodiment

Figure 1:
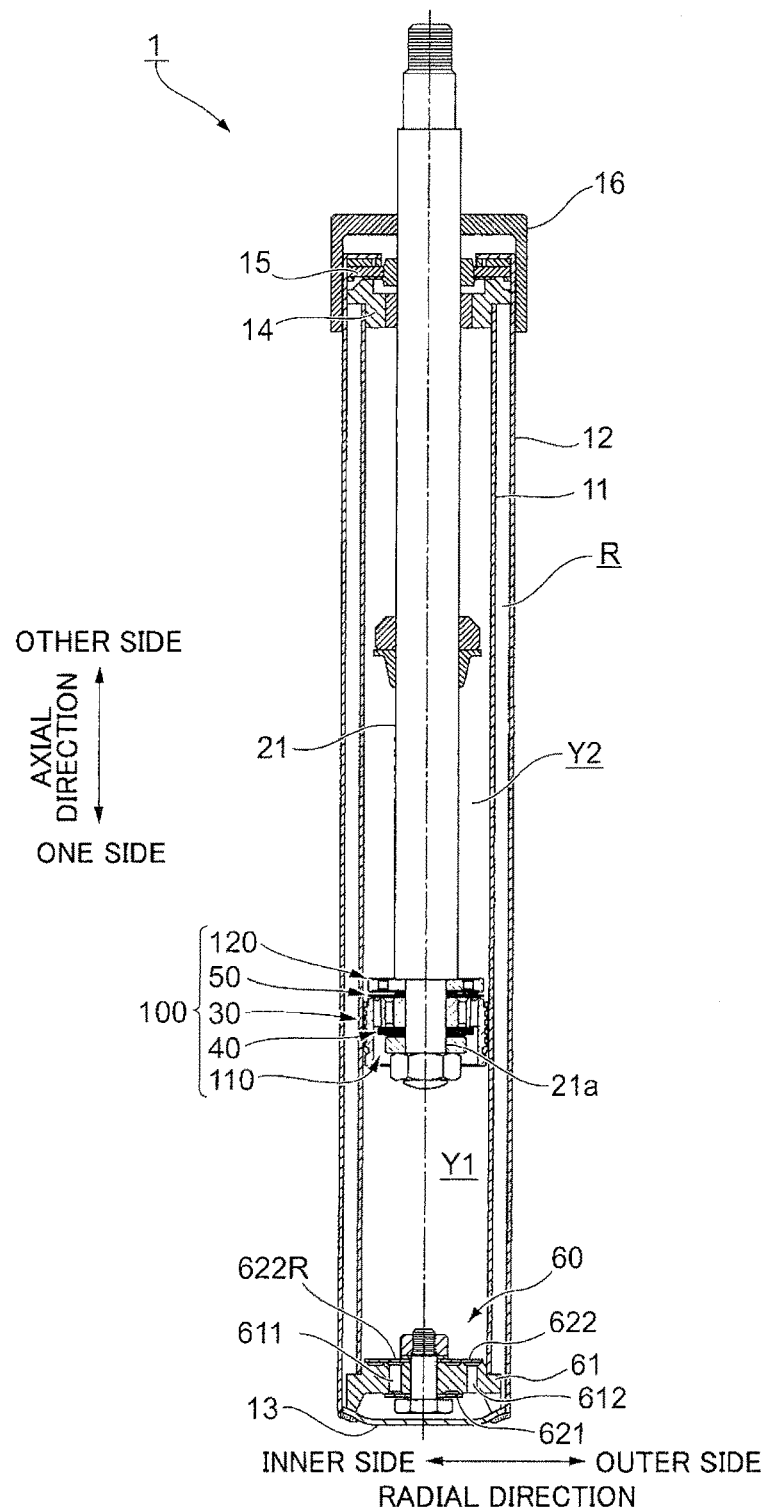
FIG. 1 is an overall configuration diagram of a hydraulic damping device according to a first embodiment.

FIG. 1 is an overall configuration diagram of a hydraulic damping device 1 according to the first embodiment.

In the following description, a longitudinal direction of the hydraulic damping device 1 shown in FIG. 1 will be referred to as an "axial direction". In addition, in the following description, a lower side of the hydraulic damping device 1 in the axial direction will be referred to as "one side" and an upper side of the hydraulic damping device 1 in the axial direction will be referred to as "other side". Furthermore, a left-right direction of the hydraulic damping device 1 shown in FIG. 1 will be referred to as a "radial direction", a side of a central axis will be referred to as an "inner side", and a side separating from the central axis will be referred to as an "outer side".

[Configuration of Hydraulic Damping Device 1]

First, a configuration of the hydraulic damping device 1 according to the first embodiment will be described.

As shown in FIG. 1, the hydraulic damping device 1 according to the first embodiment includes a first cylinder 11 and a second cylinder 12 which house oil, a piston rod 21 of which a part enters the first cylinder 11 and which is movable in the axial direction, a piston section 100 which is fixed to the piston rod 21 and which moves on an inner side of the first cylinder 11, and a bottom valve section 60 which is provided in a one side-bottom section of the first cylinder 11.

[Configurations of First Cylinder 11 and Second Cylinder 12]

As shown in FIG. 1, the hydraulic damping device 1 has a so-called double-tube structure in which the first cylinder 11 and the second cylinder 12 are sequentially provided from the inner side toward the outer side in the radial direction.

A one side-end (bottom section) of the first cylinder 11 is blocked by the bottom valve section 60. In addition, a one side-end of the second cylinder 12 is blocked by a bottom lid 13. Meanwhile, other side-ends (upper sections) of the first cylinder 11 and the second cylinder 12 are blocked by a rod guide 14, an oil seal 15, and a cap 16 so as to enable passage of the piston rod 21. Furthermore, a reservoir chamber R that is a space with a cylindrical shape is formed between the first cylinder 11 and the second cylinder 12. The reservoir chamber R houses oil and, at the same time, gas is sealed on the other side of the reservoir chamber R.

[Configuration of Piston Rod 21]

The piston rod 21 is configured so that a part on the one side enters the first cylinder 11, a remaining part on the other side is exposed to the outside of the first cylinder 11, and the piston rod 21 is movable in the axial direction. In addition, the piston rod 21 is provided with the piston section 100 at a one side-end thereof. Furthermore, the piston rod 21 and the piston section 100 integrally move in the axial direction. Moreover, the piston section 100 is provided so as to be movable in the axial direction along an inner circumferential surface of the cylinder.

[Configuration of Piston Section 100]

The piston section 100 includes a piston body 30 in which are formed a plurality of oil channels (to be described later) that penetrate the piston body 30 in the axial direction, an extension side valve group 40 which is provided on the one side of the piston body 30, a compression side valve group 50 which is provided on the other side of the piston body 30, an extension side valve stopper 110 which is provided on the one side of the extension side valve group 40, and a compression side valve stopper 120 which is provided on the other side of the compression side valve group 50.

In addition, the piston section 100 divides an inner side-space of the first cylinder 11 into a first oil chamber Y1 that is a space on the one side (a lower side in FIG. 1) in the axial direction and a second oil chamber Y2 that is a space on the other side (an upper side in FIG. 1) in the axial direction.

[Configuration of Bottom Valve Section 60]

The bottom valve section 60 includes a valve body 61 having a plurality of compression side bottom oil channels 611 that penetrate the bottom valve section 60 in an axial direction and a plurality of extension side bottom oil channels 612 that penetrate the bottom valve section 60 in an axial direction on the outer side in the radial direction of the compression side bottom oil channels 611, a compression side bottom valve 621 which is provided on the one side of the valve body 61, and an extension side bottom valve 622 which is provided on the other side of the valve body 61. In addition, the extension side bottom valve 622 includes an oil hole 622R at a position corresponding to the compression side bottom oil channels 611 in the radial direction.

Furthermore, the bottom valve section 60 is provided on a one side-end of the hydraulic damping device 1 and divides the first oil chamber Y1 and the reservoir chamber R from each other.

Next, the piston section 100 (the piston body 30, the extension side valve group 40, and the compression side valve group 50) will be described in detail.

Figure 2:
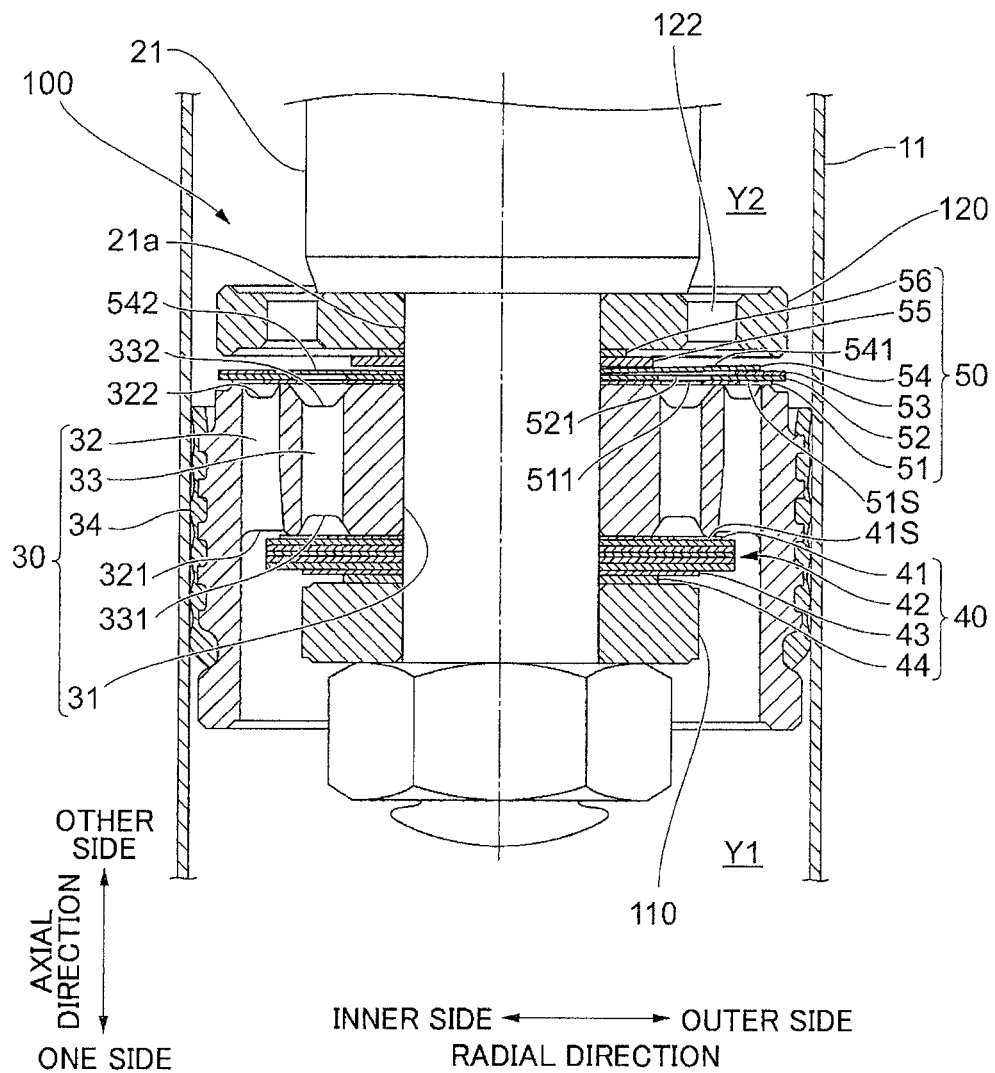
FIG. 2 is a diagram showing a piston body according to the first embodiment.

FIG. 2 is a sectional view showing the piston body 30 according to the first embodiment.

Figure 3:
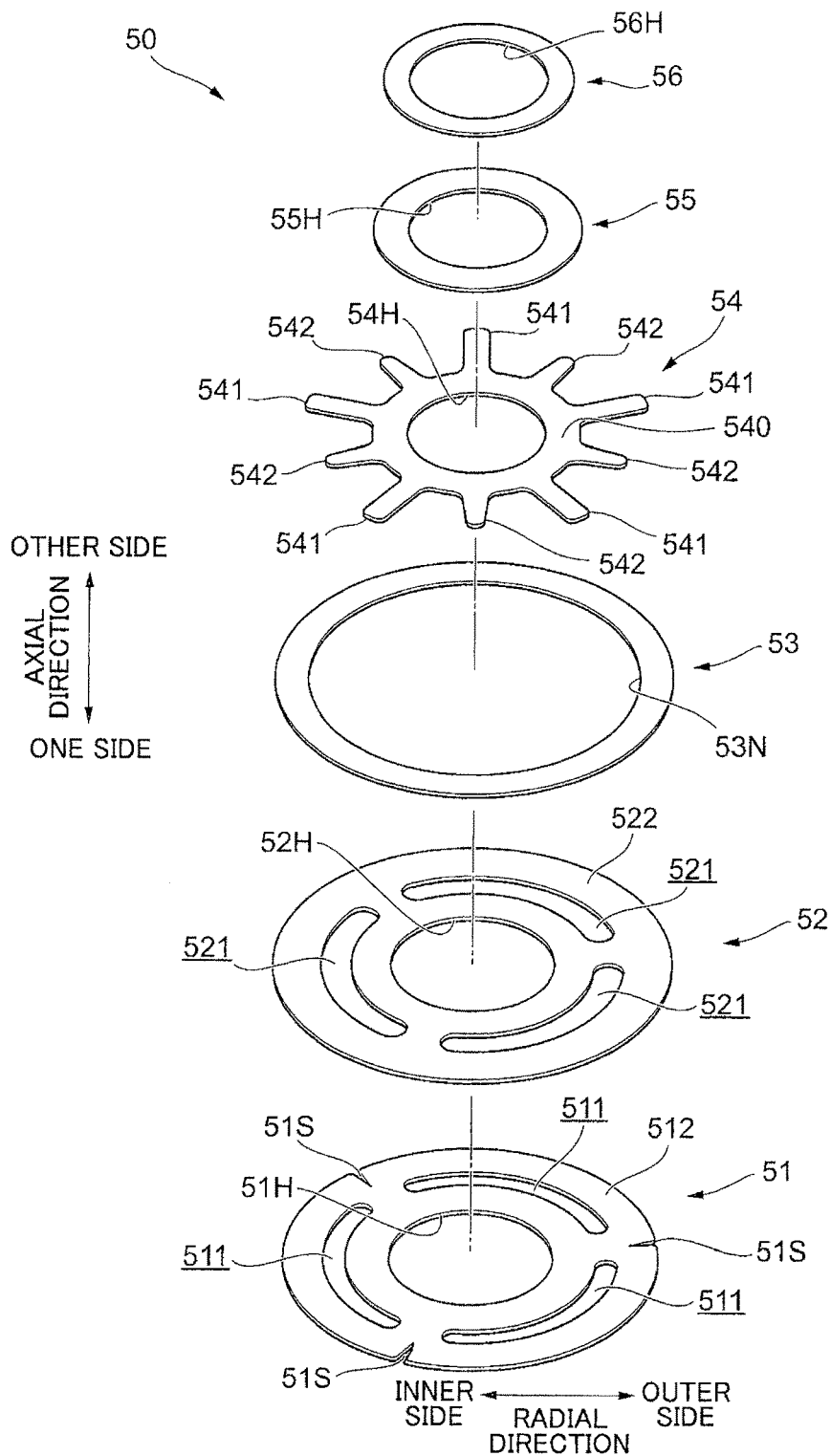
FIG. 3 is an explanatory diagram of a compression side valve group according to the first embodiment.

FIG. 3 is an explanatory diagram of the compression side valve group 50 according to the first embodiment.

As shown in FIGS. 1 and 2, the hydraulic damping device 1 (a pressure damping device) includes the first cylinder 11 (a cylinder) which houses oil (a fluid), the piston rod 21 (a rod) which has a one side-end housed in the first cylinder 11 and the other side-end protruding from an opening of the first cylinder 11 and which moves in the axial direction of the first cylinder 11, and the piston section 100 (a damping force generating unit) which generates a damping force by a movement of the piston rod 21. In addition, the piston section 100 includes the piston body 30 (a flow channel formation section) in which is formed a compression side oil channel 32 (a flow channel) through which oil flows in conjunction with a movement of the piston rod 21, a base valve 52 (an opening/closing member) which opens and closes the compression side oil channel 32 of the piston body 30, a ring-shaped ring valve 53 (an annular member) which is provided on the base valve 52 at an opposite side to a side opposing the piston body 30, and a preload spring 54 (a protruding member) which extends radially and which has a positioning section 542 (a positioning section) that determines a position of the ring valve 53 in the radial direction.

Hereinafter, the respective components will be described in detail.

[Configuration of Piston Body 30]

As shown in FIG. 2, the piston body 30 includes a through-hole 31 which extends in the axial direction, the compression side oil channel 32 which is formed in the axial direction in the piston body 30, an extension side oil channel 33 which is formed in the axial direction in the piston body 30, and a piston ring 34 which is provided on the outer side in the radial direction.

The through-hole 31 is a hole formed in an approximately cylindrical shape. In addition, a one side-mounting section 21a of the piston rod 21 is inserted into the through-hole 31.

The compression side oil channel 32 includes a compression side first oil channel port 321 which opens toward the first oil chamber Y1 on the one side and a compression side second oil channel port 322 which opens toward the second oil chamber Y2 on the other side. In addition, in the present embodiment, the compression side oil channel 32 forms a pathway of oil flowing from the first oil chamber Y1 toward the second oil chamber Y2 during a compression stroke (to be described later). Moreover, in the present embodiment, the compression side oil channel 32 is provided at a plurality of locations (in the present embodiment, eight locations) at approximately equal intervals in a circumferential direction of the piston body 30.

The extension side oil channel 33 includes an extension side first oil channel port 331 which opens toward the first oil chamber Y1 on the one side and an extension side second oil channel port 332 which opens toward the second oil chamber Y2 on the other side. In addition, the extension side oil channel 33 forms a pathway of oil flowing from the second oil chamber Y2 toward the first oil chamber Y1 during an extension stroke (to be described later). Moreover, in the present embodiment, the extension side oil channel 33 is provided at a plurality of locations (in the present embodiment, eight locations) at approximately equal intervals in the circumferential direction of the piston body 30.

The piston ring 34 is provided on an outer circumference of the piston body 30. In addition, the piston ring 34 is provided so as to be in slidable contact with an inner circumferential surface of the first cylinder 11. Furthermore, the piston ring 34 reduces frictional resistance with the first cylinder 11.

(Extension Side Valve Group 40)

As shown in FIG. 2, the extension side valve group 40 includes an extension side slit valve 41 which has an orifice 41S on an outer circumference thereof, a plurality of extension side damping valves 42 which are provided on the one side of the extension side slit valve 41, an extension side first valve seat 43 which is provided on the one side of the plurality of extension side damping valves 42, and an extension side second valve seat 44 which is provided on the one side of the extension side first valve seat 43. In addition, the extension side first valve seat 43 and the extension side second valve seat 44 act as fulcrums of deflection when the extension side damping valves 42 deform.

(Compression Side Valve Group 50)

As shown in FIGS. 2 and 3, the compression side valve group 50 includes a compression side slit valve 51, the base valve 52 which is provided on the other side of the compression side slit valve 51, the ring valve 53 which is provided on the other side of the base valve 52, the preload spring 54 which is provided on the other side of the ring valve 53, a compression side first valve seat 55 which is provided on the other side of the preload spring 54, and a compression side second valve seat 56 which is provided on the other side of the compression side first valve seat 55.

As shown in FIG. 3, the compression side slit valve 51 is a disc-shaped metallic member which has a through-hole 51H for the one side-mounting section 21a (refer to FIG. 2) of the piston rod 21 to pass through. In addition, the compression side slit valve 51 includes an oil hole 511 and a cover section 512.

The oil hole 511 is formed at a plurality of locations (in the present embodiment, three locations) in a circumferential direction of the compression side slit valve 51. The piston body 30 according to the first embodiment includes the compression side oil channels 32 (first flow channel sections) which form a flow of oil from the first oil chamber Y1 toward the second oil chamber Y2 and the extension side oil channels 33 (second flow channel sections) which form a flow of oil from the second oil chamber Y2 toward the first oil chamber Y1. In addition, the oil holes 511 are respectively formed at positions opposing the extension side second oil channel ports 332 of the extension side oil channels 33 (refer to FIG. 2). In other words, the oil holes 511 (opened sections) always open the extension side second oil channel ports 332 (the other side of the extension side oil channels 33).

On the other hand, the cover section 512 is a section which is formed in a ring shape on the outer side of the oil holes 511 in the radial direction of the compression side slit valve 51. In addition, the cover section 512 is formed at a position opposing the compression side second oil channel ports 322 of the compression side oil channels 32. Furthermore, the cover section 512 opens and closes the compression side second oil channel ports 322 in accordance with a flow of oil at the compression side second oil channel ports 322.

In addition, the compression side slit valve 51 includes an orifice 51S on an outer circumference thereof. The orifice 51S is formed in a notched shape in a part of the cover section 512. Furthermore, the orifice 51S is formed so as to oppose the compression side second oil channel ports 322 of the compression side oil channels 32 (refer to FIG. 2).

The base valve 52 is a disc-shaped metallic member which has a through-hole 52H for the one side-mounting section 21a (refer to FIG. 2) of the piston rod 21 to pass through. In addition, the base valve 52 includes an oil hole 521 and a cover section 522.

Furthermore, the oil hole 521 is formed at a plurality of locations (in the present embodiment, three locations) in a circumferential direction of the base valve 52. Moreover, the oil holes 521 are respectively formed at positions opposing the extension side second oil channel ports 332 of the extension side oil channels 33 (refer to FIG. 2). In other words, the oil holes 521 always open the extension side second oil channel ports 332 with the oil holes 511 of the compression side slit valve 51 positioned in-between.

On the other hand, the cover section 522 is a section which is formed in a ring shape on the outer side of the oil holes 521 in the radial direction of the base valve 52. In addition, the cover section 522 is formed at a position opposing the compression side second oil channel ports 322 of the compression side oil channels 32. Furthermore, together with the compression side slit valve 51, the cover section 522 opens and closes the compression side second oil channel ports 322 in accordance with a flow of oil at the compression side second oil channel ports 322.

The ring valve 53 is a metallic member which is formed in a ring shape and which includes an opening 53N on the inner side in the radial direction. An outer diameter of the ring valve 53 is formed approximately equal to an outer diameter of the base valve 52. In addition, an inner diameter of the ring valve 53 is made larger than an outer side-edge in the radial direction of the oil holes 521 of the base valve 52. In other words, the ring valve 53 is configured so as not to block the oil holes 521 of the base valve 52.

The preload spring 54 is a disc-shaped metallic member which has a through-hole 54H for the one side-mounting section 21a (refer to FIG. 2) of the piston rod 21 to pass through. In addition, the preload spring 54 is an elastic member having an elastic force. Furthermore, the preload spring 54 includes an annular section 540 which is provided on the inner side in the radial direction and on which the through-hole 54H is formed, a plurality of (in the present embodiment, five) pressing sections 541 which are formed on the outer side in the radial direction with respect to the annular section 540, and a plurality of (in the present embodiment, five) positioning sections 542 which are formed on the outer side in the radial direction with respect to the annular section 540.

Moreover, the preload spring 54 will be described later in detail with reference to FIGS. 4 to 5C.

The compression side first valve seat 55 is a ring-shaped metallic member which has a through-hole 55H for the one side-mounting section 21a of the piston rod 21 to pass through. An outer diameter of the compression side first valve seat 55 is smaller than the compression side slit valve 51 and the base valve 52. In addition, in the present embodiment, the compression side first valve seat 55 forms a space when the compression side slit valve 51 and the base valve 52 deform and, at the same time, functions as a fulcrum of deflection when the compression side slit valve 51 and the base valve 52 deform.

The compression side second valve seat 56 is a ring-shaped metallic member which has a through-hole 56H for the one side-mounting section 21a of the piston rod 21 to pass through. An outer diameter of the compression side second valve seat 56 is smaller than the compression side first valve seat 55. In addition, in the present embodiment, the compression side second valve seat 56 forms a space when the compression side first valve seat 55, the compression side slit valve 51 and the base valve 52 deform and, at the same time, functions as a fulcrum of deflection when the compression side first valve seat 55, the compression side slit valve 51 and the base valve 52 deform.

(Extension Side Valve Stopper 110, Compression Side Valve Stopper 120)

As shown in FIG. 2, the piston rod 21 passes through a central portion of the extension side valve stopper 110, and the extension side valve stopper 110 is formed smaller than the extension side damping valve 42 and prevents the extension side damping valve 42 from deforming to the one side beyond the extension side valve stopper 110.

The piston rod 21 passes through a central portion of the compression side valve stopper 120, and the compression side valve stopper 120 is formed with an outer diameter that is approximately equal to those of the compression side slit valve 51 and the base valve 52 and prevents the compression side slit valve 51 and the base valve 52 from deforming further to the one side than the compression side valve stopper 120. In addition, the compression side valve stopper 120 includes a plurality of oil channels 122. In the present embodiment, the oil channels 122 are provided at positions opposing the extension side second oil channel ports 332 of the extension side oil channels 33.

—Preload Spring 54—

Figure 4:
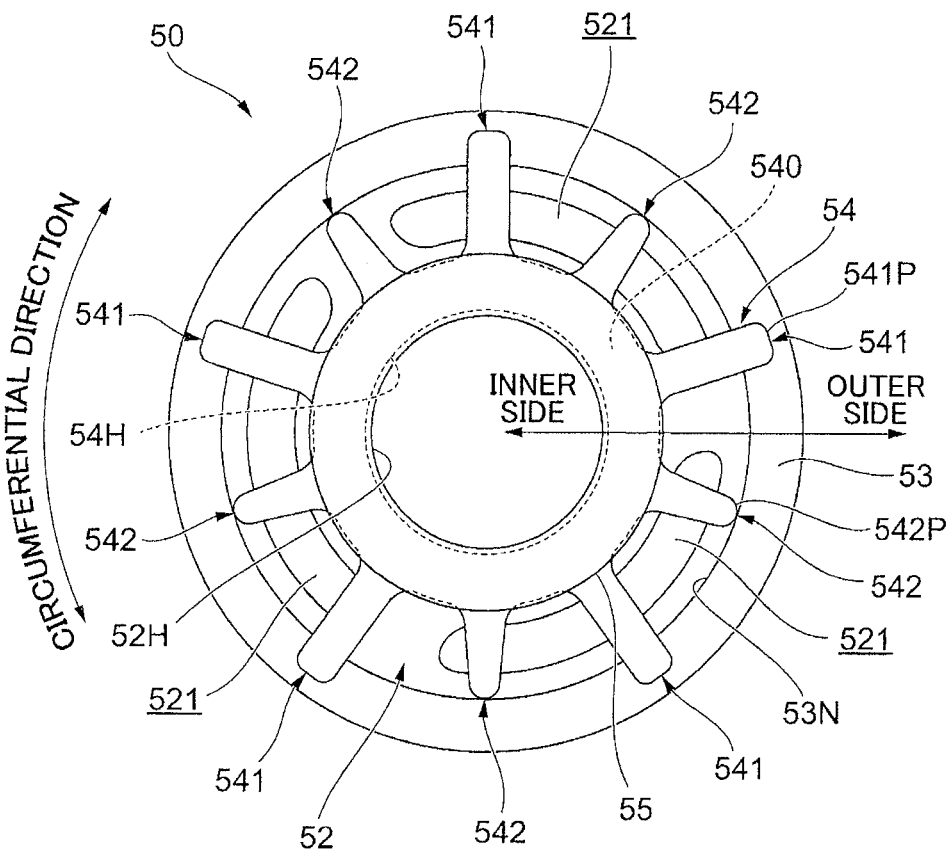
FIG. 4 is an explanatory diagram of a preload spring according to the first embodiment.

FIG. 4 is an explanatory diagram of the preload spring 54 according to the first embodiment.

Figure 5A:
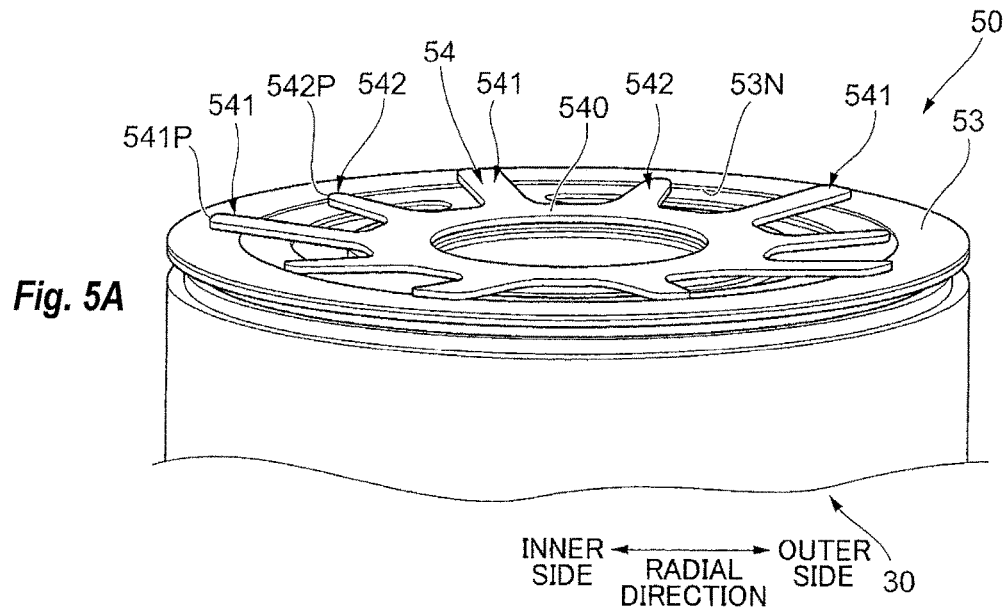
FIGS. 5A to 5C are diagrams showing an assembled state of the preload spring according to the first embodiment.
Figure 5B:
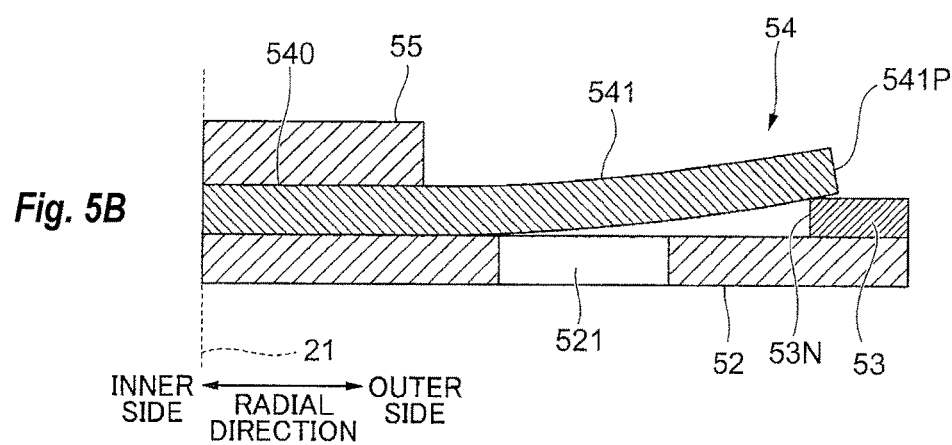
Figure 5C:
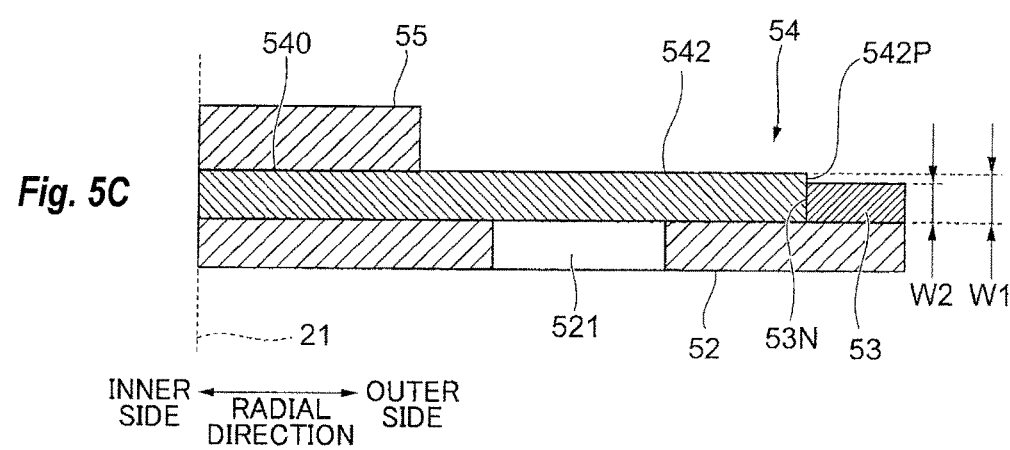

FIGS. 5A to 5C are diagrams showing an assembled state of the preload spring 54 according to the first embodiment.

As shown in FIG. 4, an outer diameter of the annular section 540 is formed smaller than an inner diameter of the ring valve 53. Furthermore, in the present embodiment, the outer diameter of the annular section 540 is formed so as to be further on the inner side than the oil holes 521 of the base valve 52 in the radial direction.

As shown in FIG. 4, the pressing sections 541 are formed so as to protrude toward the outer side in the radial direction. In other words, the pressing sections 541 are formed so as to extend radially. In addition, in the present embodiment, the plurality of pressing sections 541 are arranged at approximately equal intervals in the circumferential direction. Furthermore, an outline of each of the pressing sections 541 is formed in an approximately rectangular shape. In other words, the pressing sections 541 are formed with approximately equal widths in the radial direction. In addition, ends 541P of the pressing sections 541 are formed in approximately straight lines.

In addition, as shown in FIGS. 5A and 5B, the ends 541P of the respective pressing sections 541 are positioned further on the outer side than the opening 53N of the ring valve 53. Therefore, in a state where the preload spring 54 is assembled, the plurality of pressing sections 541 are positioned so as to overlap with the ring valve 53 on the other side of the ring valve 53. Furthermore, as shown in FIG. 5B, the preload spring 54 is sandwiched between the base valve 52 and the compression side first valve seat 55 in the annular section 540 on the inner side in the radial direction. Therefore, the preload spring 54 presses the ring valve 53 towards the one side with the plurality of pressing sections 541.

In particular, the preload spring 54 is pressed against the base valve 52 by the annular section 540 positioned on the one side thereof as described above. Meanwhile, the side of the ends 541P of the pressing sections 541 is hooked on the ring valve 53 which protrudes further toward the other side than the base valve 52. As a result, the pressing sections 541 come into contact with the ring valve 53 in a deflected state. Therefore, with an elastic force (restoring force) of the pressing sections 541, the preload spring 54 applies a force (load) which presses the base valve 52 against the piston body 30 via the ring valve 53 even in a state before the base valve 52 deforms as will be described later.

Moreover, while the present embodiment adopts a configuration in which five pressing sections 541 are provided, the number of pressing sections 541 is not limited to this example. The pressing sections 541 need only press the ring valve 53 toward the one side and, for example, two or more pressing sections 541 are favorably provided.

As shown in FIG. 4, the positioning sections 542 are formed so as to protrude toward the outer side in the radial direction. In other words, the positioning sections 542 are formed so as to extend radially. In addition, in the present embodiment, the plurality of positioning sections 542 are arranged at approximately equal intervals in the circumferential direction. Furthermore, the positioning sections 542 are arranged between two adjacent pressing sections 541. In other words, in the present embodiment, the pressing sections 541 and the positioning sections 542 are alternately arranged in the circumferential direction.

In addition, in the present embodiment, the positioning sections 542 are formed in approximately tapered shapes whose width decreases toward the outer side in the radial direction. Ends 542P of the positioning sections 542 are formed in approximately semi-circular shapes.

As shown in FIGS. 5A and 5C, the outer side-ends 542P in the radial direction are formed approximately equal to an inner diameter of the opening 53N of the ring valve 53. In other words, a protrusion length of the positioning sections 542 in the radial direction is formed shorter than a protrusion length of the pressing sections 541 in the radial direction. Therefore, the ends 542P of the positioning sections 542 come into contact with an inner circumference of the opening 53N of the ring valve 53.

In addition, as shown in FIG. 5C, a thickness W1 of the positioning sections 542 according to the present embodiment is formed larger than a thickness W2 of the ring valve 53.

Therefore, as shown in FIGS. 5A and 5C, in a state where the preload spring 54 is assembled, the plurality of positioning sections 542 are positioned arranged on an approximately same plane as the ring valve 53. Specifically, the positioning sections 542 are arranged at approximately same height positions as the ring valve 53 on the other side of the base valve 52. In this case, a position of the preload spring 54 itself in the radial direction is determined by the piston rod 21 on the inner side. Therefore, the preload spring 54 determines a position of the ring valve 53 in the radial direction with the plurality of positioning sections 542.

In addition, as shown in FIG. 4, while the pressing sections 541 and the positioning sections 542 which are formed so as to extend radially partially overlap with the oil holes 521 of the base valve 52, the pressing sections 541 and the positioning sections 542 open the oil holes 521 as a whole. Furthermore, the preload spring 54 enables a constant flow of oil through the oil holes 521 of the base valve 52.

Moreover, while the present embodiment adopts a configuration in which five positioning sections 542 are provided, the number of positioning sections 542 is not limited to this example. The positioning sections 542 need only position the ring valve 53 in the radial direction and, for example, three or more positioning sections 542 are favorably provided.

In addition, the thickness W1 of the positioning sections 542 in the present embodiment shown in FIG. 5C may be the same as the thickness W2 of the ring valve 53 or may be smaller than the thickness W2 of the ring valve 53.

Furthermore, a slight gap may be provided between the positioning sections 542 and the inner diameter (the opening 53N) of the ring valve 53.

[Operations of Hydraulic Damping Device 1]

Next, operations of the hydraulic damping device 1 according to the first embodiment will be described.

Figures 6A, 6B:
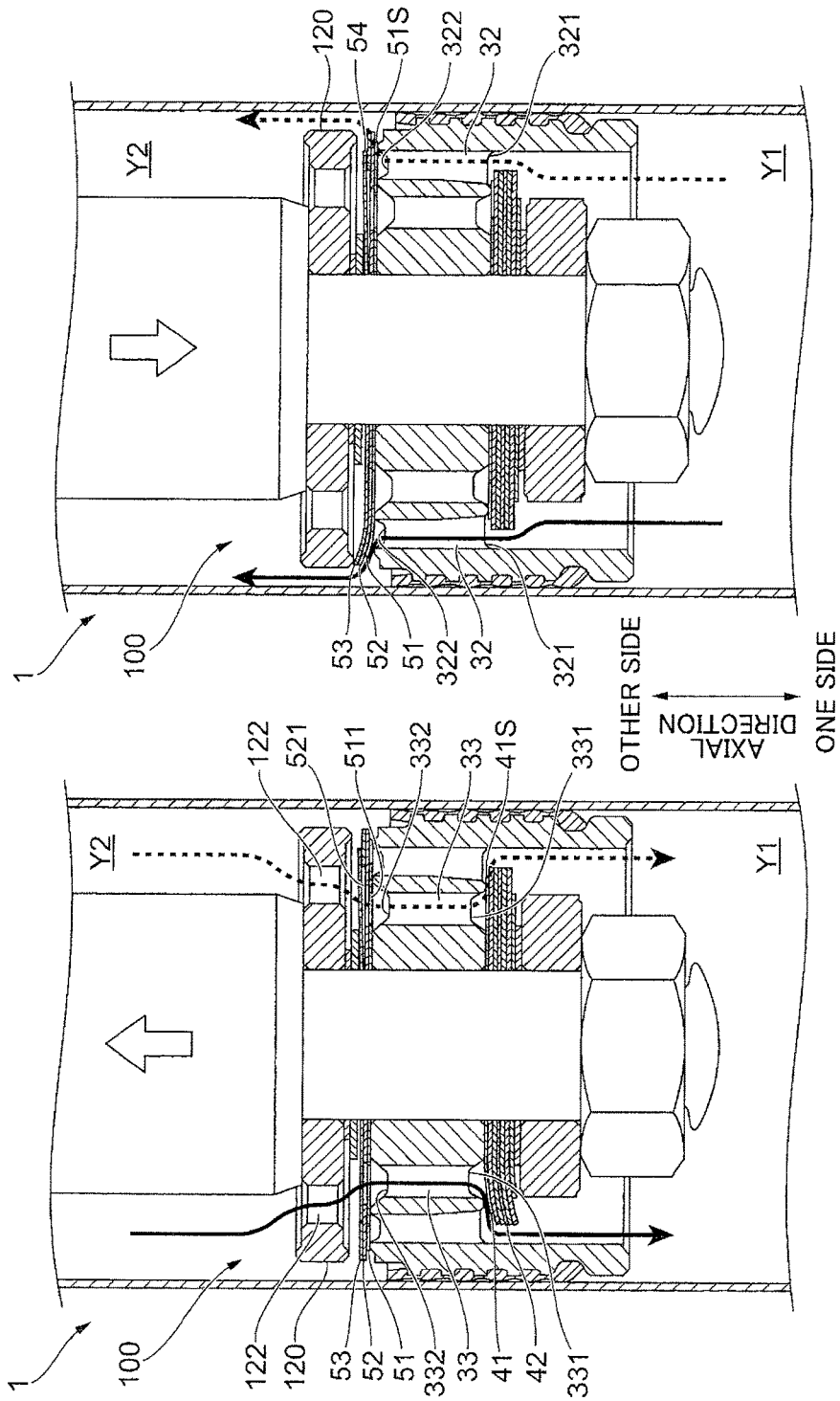
FIGS. 6A and 6B are diagrams showing a flow of oil in a piston section of the hydraulic damping device according to the first embodiment.

FIGS. 6A and 6B are diagrams showing a flow of oil in the piston section 100 of the hydraulic damping device 1 according to the first embodiment. Specifically, FIG. 6A shows a flow of oil during an extension stroke and FIG. 6B shows a flow of oil during a compression stroke.

(During Extension Stroke)

During an extension stroke of the hydraulic damping device 1, the piston rod 21 moves to the other side in the axial direction (an upper side in FIG. 6A) with respect to the first cylinder 11. As the piston rod 21 moves, oil in the second oil chamber Y2 is compressed and negative pressure is created in the first oil chamber Y1.

At this point, in a case where a speed of movement of the piston rod 21 is at a so-called very low speed, the oil in the second oil chamber Y2 flows through the oil channel 122 of the compression side valve stopper 120, the oil holes 521 of the base valve 52, and the oil holes 511 of the compression side slit valve 51 and into the extension side oil channels 33 of the piston body 30. In addition, the oil having flowed into the extension side oil channels 33 flows from the extension side first oil channel ports 331 through the orifice 41S of the extension side slit valve 41 and out to the first oil chamber Y1 (an arrow depicted by a dashed line in FIG. 6A).

In addition, when the speed of movement of the piston rod 21 is relatively high, the oil in the second oil chamber Y2 similarly flows into the extension side oil channels 33 of the piston body 30. Furthermore, the oil having flowed into the extension side oil channels 33 flows out to the first oil chamber Y1 while opening the extension side damping valve 42 which closes the extension side first oil channel ports 331 (an arrow depicted by a solid line in FIG. 6A).

Furthermore, as shown in FIG. 1, oil in the reservoir chamber R opens the extension side bottom valve 622 which closes the extension side bottom oil channel 612 of the valve body 61 and flows into the first oil chamber Y1.

(During Compression Stroke)

During a compression stroke of the hydraulic damping device 1, the piston rod 21 moves to the one side in the axial direction (a lower side in FIG. 6B) with respect to the first cylinder 11. The piston section 100 fixed to the piston rod 21 compresses oil inside the first oil chamber Y1 and causes pressure in the first oil chamber Y1 to rise.

At this point, when the speed of movement of the piston rod 21 is at a so-called very low speed, the oil in the first oil chamber Y1 flows into the compression side oil channels 32 of the piston body 30. In addition, the oil having flowed into the compression side oil channels 32 flows from the compression side second oil channel ports 322 through the orifice MS of the compression side slit valve 51 and out to the second oil chamber Y2 (an arrow depicted by a dashed line in FIG. 6B).

In addition, when the speed of movement of the piston rod 21 is relatively high, the oil having flowed into the compression side oil channels 32 flows out to the second oil chamber Y2 while opening the base valve 52 which closes the compression side second oil channel ports 322 (an arrow depicted by a solid line in FIG. 6B).

Furthermore, as shown in FIG. 1, in the bottom valve section 60, the oil in the first oil chamber Y1 flows through the oil hole 622R of the extension side bottom valve 622 and into the compression side bottom oil channel 611. Moreover, the oil in the compression side bottom oil channel 611 opens the compression side bottom valve 621 which closes the compression side bottom oil channel 611 and flows out from the first oil chamber Y1 to the reservoir chamber R.

In addition, in the first embodiment, the base valve 52 deforms during a compression stroke, and when a transition is subsequently made to an extension stroke, the preload spring 54 immediately displaces the base valve 52 toward the one side and the base valve 52 blocks the compression side oil channels 32. Accordingly, the hydraulic damping device 1 according to the first embodiment can promptly perform preparations for switching the hydraulic damping device 1 from a compression stroke to an extension stroke as well as switching to the next compression stroke.

Furthermore, in the present embodiment, the preload spring 54 determines a position of the ring valve 53 in the radial direction. Accordingly, even when use of the hydraulic damping device 1 extends over a long period of time, the position of the ring valve 53 in the radial direction is fixed in a stable manner.

First Modification

Figure 7:
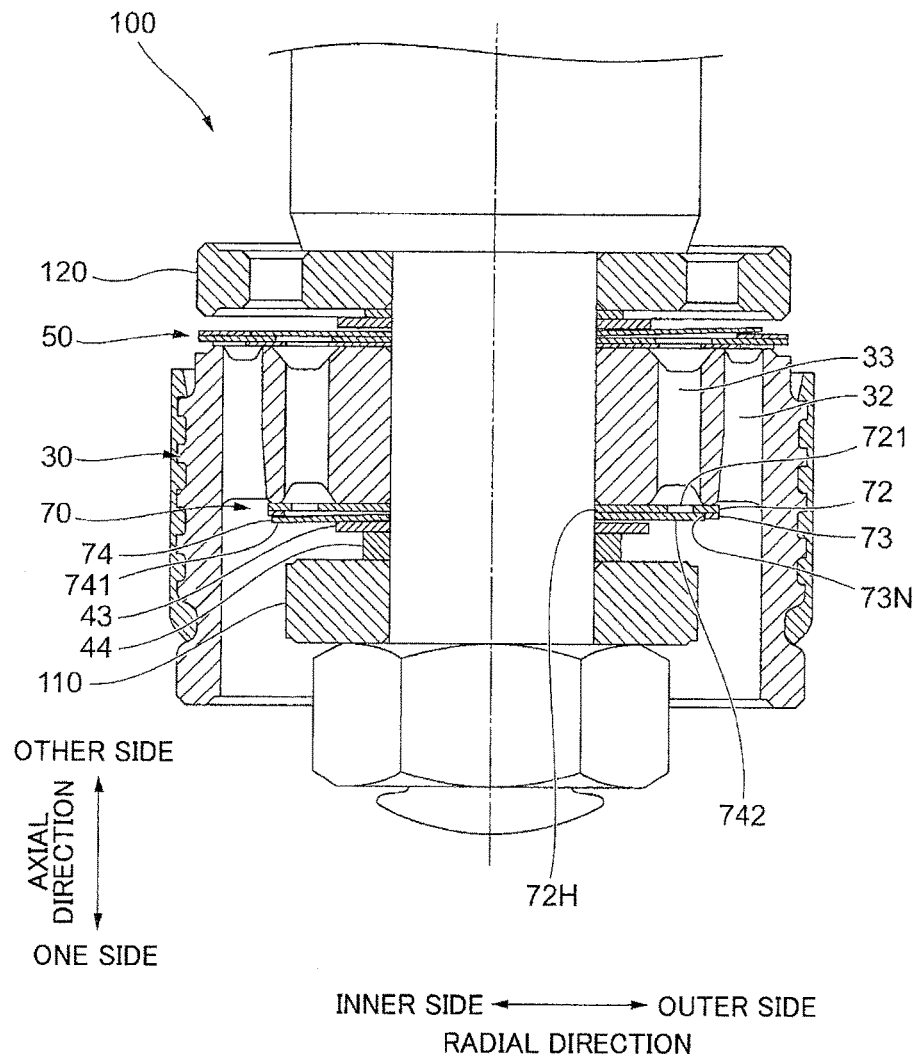
FIG. 7 is an overall view of a piston section according to a first modification.

FIG. 7 is an overall view of the piston section 100 according to a first modification. Next, the piston section 100 according to the first modification will be described. Moreover, in the first modification, components similar to those of the first embodiment will be assigned same numbers and detailed descriptions thereof will be omitted.

As shown in FIG. 7, the hydraulic damping device 1 according to the first modification includes an extension side valve group 70 in place of the extension side valve group 40 according to the first embodiment.

(Extension Side Valve Group 70)

The extension side valve group 70 includes a base valve 72, a ring valve 73 which is provided on the one side of the base valve 72, a preload spring 74 which is provided on the one side of the ring valve 73, an extension side first valve seat 43 which is provided on the one side of the preload spring 74, and an extension side second valve seat 44 which is provided on the one side of the extension side first valve seat 43.

Basic configurations of the base valve 72, the ring valve 73, and the preload spring 74 according to the first modification are respectively similar to those of the base valve 52, the ring valve 53, and the preload spring 54 according to the first embodiment.

The base valve 72 is a disc-shaped metallic member which has a through-hole 72H for the one side-mounting section 21a (refer to FIG. 2) of the piston rod 21 to pass through. In addition, the base valve 72 includes an oil hole 721. The oil hole 721 is formed at a position opposing the extension side oil channels 33 and is formed smaller than a width (a flow channel sectional area) of the extension side oil channels 33.

The ring valve 73 includes an opening 73N. The opening 73N is formed so as not to block the oil hole 721.

The preload spring 74 includes a plurality of pressing sections 741 which extend radially and a plurality of positioning sections 742 which extend radially. In addition, the preload spring 74 presses the base valve 72 towards the one side of the piston body 30 via the ring valve 73 with the pressing sections 741. Furthermore, the preload spring 74 determines a position of the ring valve 73 in the radial direction with the positioning sections 742.

With the piston section 100 according to the first modification which is configured as described above, a damping force is generated by the compression side valve group 50 during a compression stroke. In addition, a damping force is generated by the extension side valve group 70 during an extension stroke. In particular, in the base valve 72, the oil hole 721 of the base valve 72 is provided at a position opposing the extension side oil channels 33. Therefore, oil having flowed into the extension side oil channels 33 flows through the oil hole 721 of the base valve 72. However, when oil attempts to flow in an amount equal to or exceeding an amount allowed by the oil hole 721, the base valve 72 deforms and opens the extension side oil channels 33. In this manner, with the piston section 100 according to the first modification, the oil hole 721 provided on the base valve 72 gives generated damping force its characteristics.

In addition, in the first modification, the preload spring 74 adjusts an easiness of opening of the base valve 72 when the pressing section 741 causes the base valve 72 to deform so as to open the extension side oil channels 33. In other words, the pressing section 741 of the preload spring 74 adjusts a damping force in an initial stage (a so-called rise time of the damping force) during an extension stroke. Furthermore, the preload spring 74 determines a position of the ring valve 73 in the radial direction with the positioning section 742.

Moreover, for example, in the preload spring 74 according to the first modification, the plurality of pressing sections 741 may respectively have different shapes. In a similar manner, for example, in the preload spring 74 according to the first modification, the plurality of pressing sections 741 may respectively have different widths. Accordingly, for example, when the preload spring 74 causes the base valve 72 to deform due to oil, generated damping force is given its characteristics by imparting variation to the base valve 72 in the circumferential direction.

Second Modification

Figure 8:
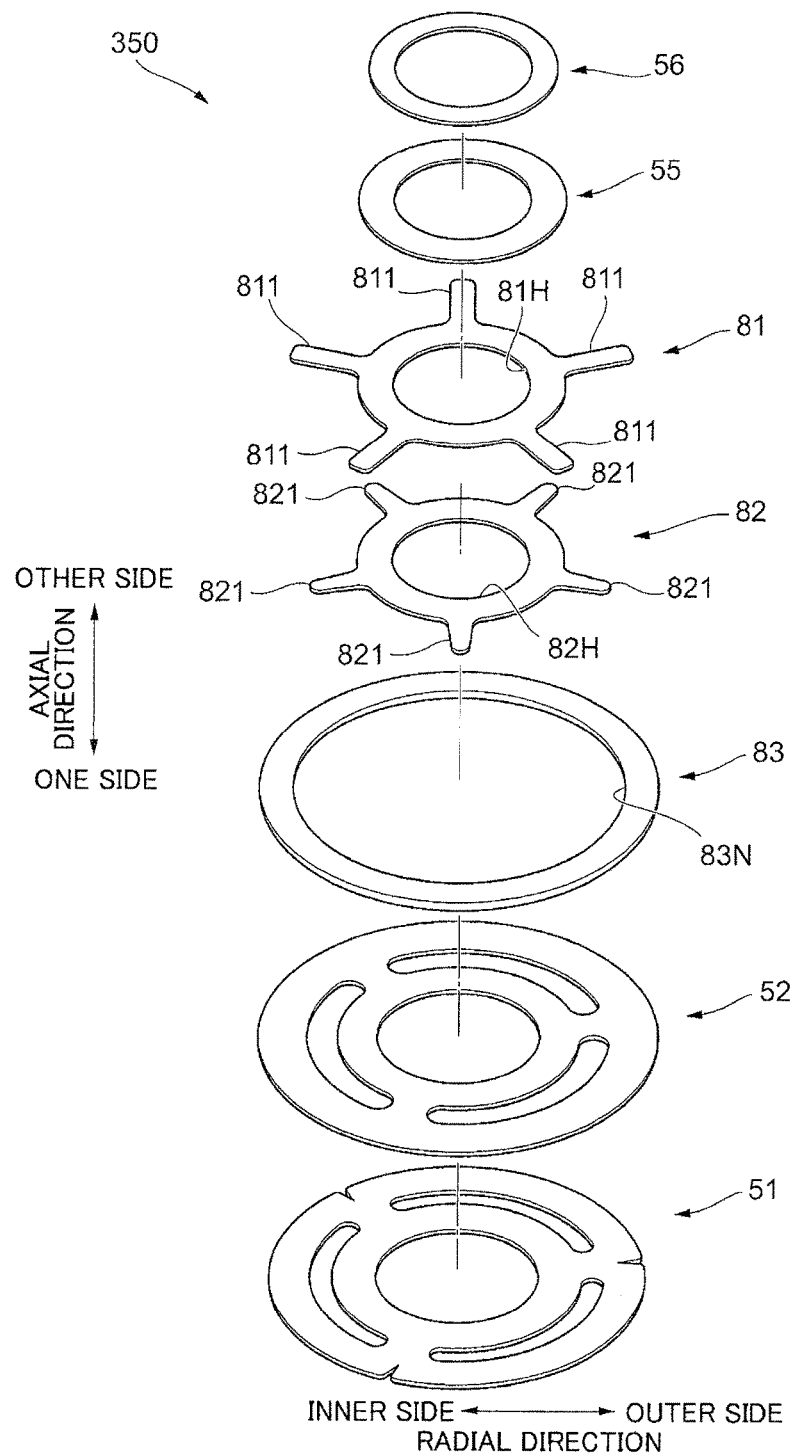
FIG. 8 is an exploded perspective view of a compression side valve group according to a second modification.

FIG. 8 is an exploded perspective view of a compression side valve group 350 according to a second modification.

Next, the piston section 100 according to the second modification will be described. Moreover, in the second modification, components similar to those of the first embodiment will be assigned same numbers and detailed descriptions thereof will be omitted.

As shown in FIG. 8, the hydraulic damping device 1 according to the second modification includes a ring valve 83 in place of the ring valve 53 according to the first embodiment and includes a second preload spring 81 and a positioning ring 82 in place of the preload spring 54 according to the first embodiment.

The ring valve 83 is a metallic member including an opening 83N. The opening 83N is formed so as not to block the oil holes 521 of the base valve 52. In addition, a thickness of the ring valve 83 is formed larger than a thickness when the second preload spring 81 and the positioning ring 82 are overlapped with each other.

The second preload spring 81 is a disc-shaped metallic member which has a through-hole 81H for the one side-mounting section 21a (refer to FIG. 2) of the piston rod 21 to pass through. In addition, the second preload spring 81 includes a plurality of (in the second modification, five) pressing sections 811 which extend radially. Furthermore, the second preload spring 81 presses the ring valve 83 toward the base valve 52 with the pressing sections 811.

The positioning ring 82 is a disc-shaped metallic member which has a through-hole 82H for the one side-mounting section 21a (refer to FIG. 2) of the piston rod 21 to pass through. In addition, the positioning ring 82 includes a plurality of (in the second modification, five) positioning sections 821 which extend radially. Furthermore, the positioning ring 82 determines a position of the ring valve 83 in the radial direction with the positioning sections 821.

Third Modification

Figure 9A:
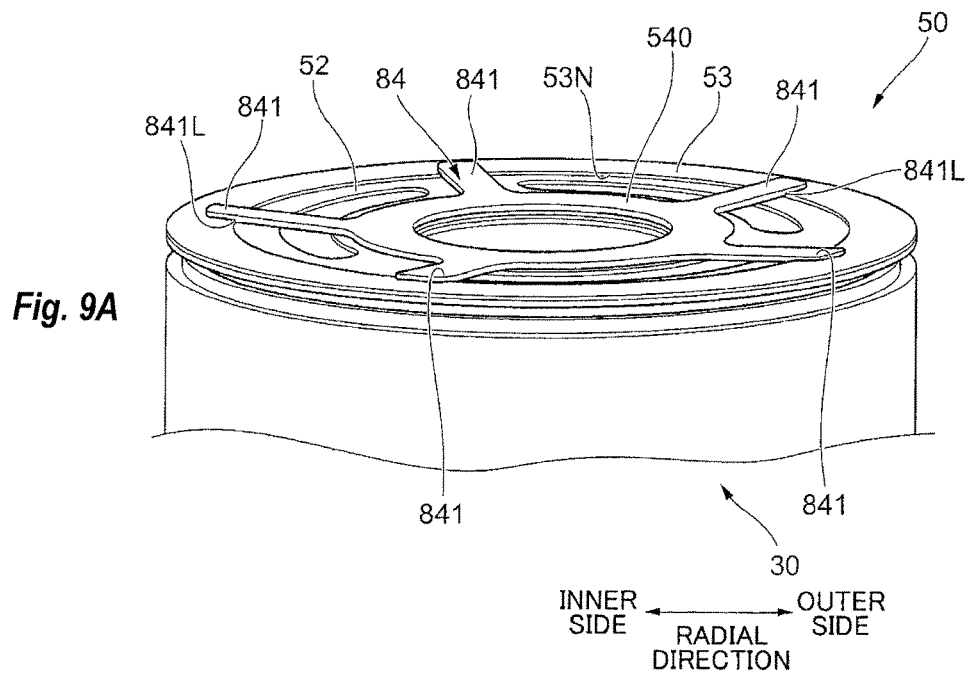
FIGS. 9A and 9B are explanatory diagrams of a hydraulic damping device according to a third modification.
Figure 9B:
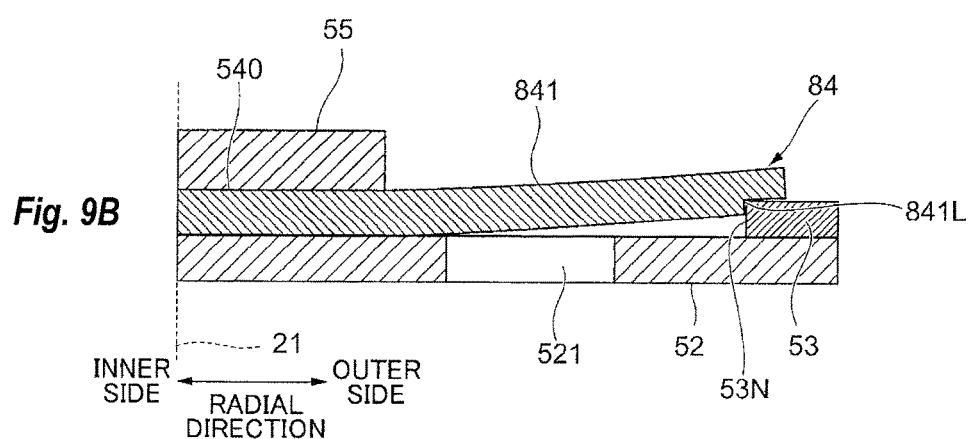

FIGS. 9A and 9B are explanatory diagrams of the piston section 100 according to a third modification.

Next, the piston section 100 according to the third modification will be described. Moreover, in the third modification, components similar to those of the first embodiment will be assigned same numbers and detailed descriptions thereof will be omitted.

A third preload spring 84 according to the third modification includes an annular section 540 and a pressing positioning section 841 which is formed on the outer side of the annular section 540 in the radial direction.

The pressing positioning section 841 is formed so as to protrude in the radial direction. In other words, the pressing positioning section 841 is formed so as to extend radially. In addition, the pressing positioning section 841 is provided in plurality (in the present example, five) at approximately equal intervals in the circumferential direction. Furthermore, a total length of the pressing positioning sections 841 is formed longer than the opening 53N of the ring valve 53.

Moreover, the pressing positioning sections 841 include a stepped section 841L. The stepped section 841L is formed at a position which come into contact with the opening 53N (an inner circumference thereof) of the ring valve 53. In addition, the pressing positioning sections 841 determine a position of the ring valve 53 in the radial direction with the stepped section 841L.

As described above, the third preload spring 84 according to the third modification presses the ring valve 53 toward the base valve 52 as a whole and, at the same time, determines the position of the ring valve 53 in the radial direction with the stepped section 841L. In other words, the third preload spring 84 according to the third modification is configured such that a single pressing positioning section 841 doubles as, for example, the pressing section 541 and the positioning section 542 of the preload spring 54 according to the first embodiment.

Moreover, in the third preload spring 84, a stepped section that comes into contact with an inner circumference of the ring valve 53 may be formed by giving the pressing positioning sections 841 an approximately same thickness in the radial direction and by folding the pressing positioning sections 841.

Second Embodiment

Figure 10:
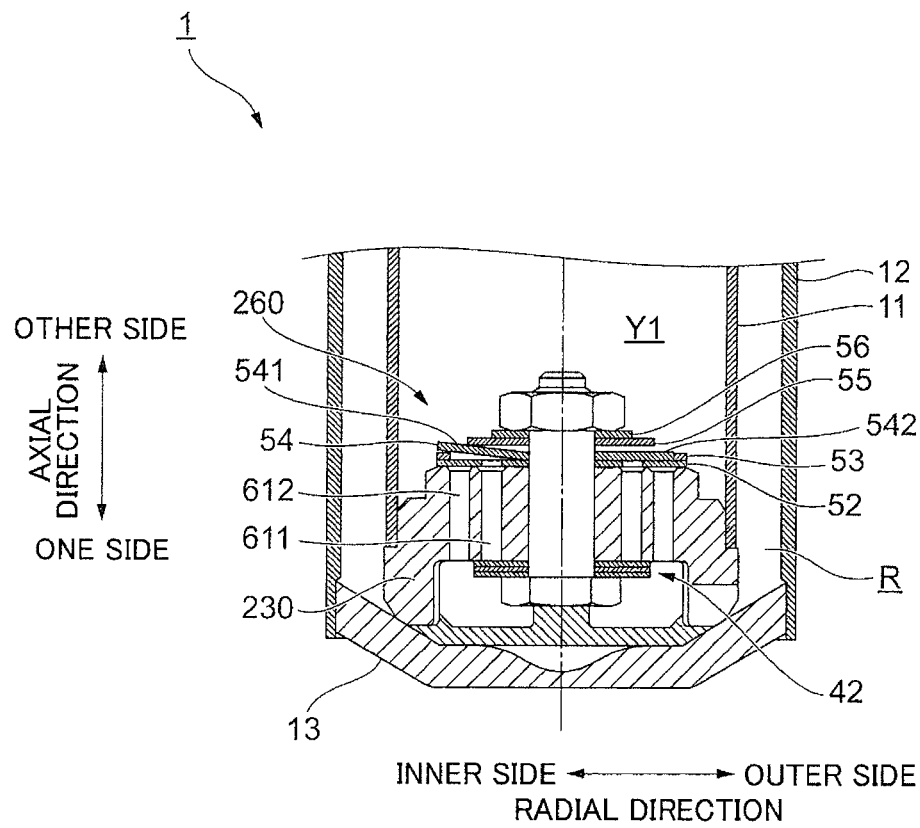
FIG. 10 is an explanatory diagram of a hydraulic damping device according to a second embodiment.

FIG. 10 is an explanatory diagram of a hydraulic damping device 1 according to a second embodiment.

Next, the hydraulic damping device 1 according to the second embodiment will be described. Moreover, in the second embodiment, components similar to those of the first embodiment will be assigned same numbers and detailed descriptions thereof will be omitted.

First, an outline of the hydraulic damping device 1 according to the second embodiment will be described.

As shown in FIGS. 1 and 10, the hydraulic damping device 1 (a pressure damping device) according to the second embodiment includes a first cylinder 11 (a cylinder) which houses oil (a fluid), a piston rod 21 (a rod) which has a one side-end housed in the first cylinder 11 and the other side-end protruding from an opening of the first cylinder 11 and which moves in the axial direction of the first cylinder 11, and a bottom valve section 260 (a damping force generating unit) which generates a damping force by a movement of the piston rod 21. In addition, the bottom valve section 260 includes a valve body 230 (a flow channel formation section) in which is formed an extension side bottom oil channel 612 (a flow channel) through which oil flows in conjunction with a movement of the piston rod 21, a base valve 52 (an opening/closing member) which opens and closes the extension side bottom oil channel 612 of the valve body 230, a ring-shaped ring valve 53 (an annular member) which is provided on an opposite side to a side opposing the valve body 230 of the base valve 52, and a preload spring 54 (a protruding member) which extends radially and which has a positioning section 542 (a positioning section) that determines a position of the ring valve 53 in the radial direction.

Even with the hydraulic damping device 1 according to the second embodiment which is configured as described above, oil between a first oil chamber Y1 and a reservoir chamber R circulates in the bottom valve section 260 in conjunction with a movement of a piston section (not shown). In addition, even in the second embodiment, the preload spring 54 presses the ring valve 53 toward the base valve 52 with the pressing sections 541. In particular, the preload spring 54 imparts force via the ring valve 53 when the base valve 52 attempts to close a flow channel of oil and acts so as to immediately close the base valve 52. Furthermore, the preload spring 54 determines a position of the ring valve 53 in the radial direction with the positioning section 542.

Third Embodiment

Figure 11:
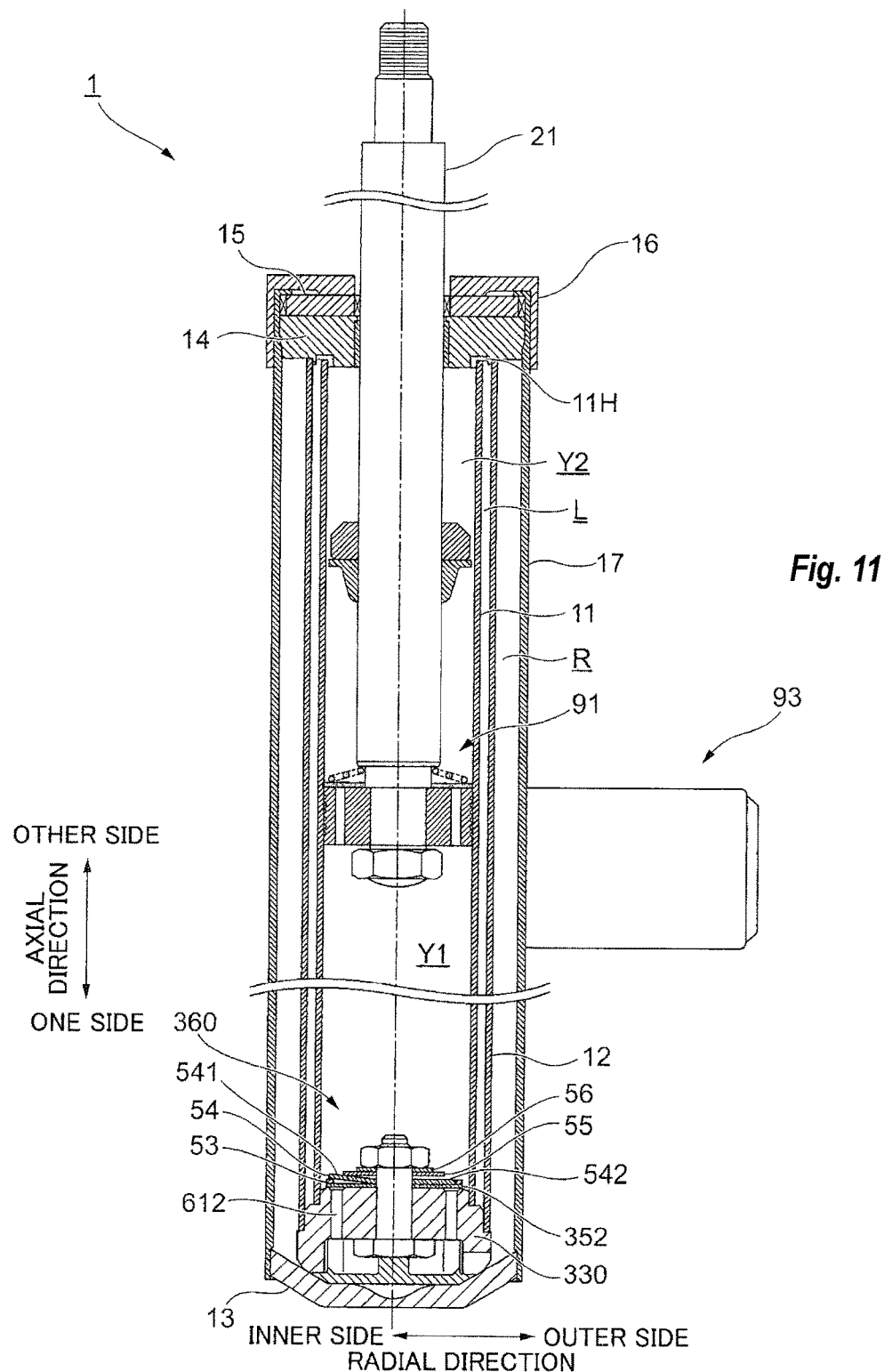
FIG. 11 is an overall view of a hydraulic damping device according to a third embodiment.

FIG. 11 is an overall view of a hydraulic damping device 1 according to a third embodiment.

Next, the hydraulic damping device 1 according to the third embodiment will be described. Moreover, in the third embodiment, components similar to those of the first embodiment will be assigned same numbers and detailed descriptions thereof will be omitted.

First, an outline of the hydraulic damping device 1 according to the third embodiment will be described.

As shown in FIG. 11, the hydraulic damping device 1 (a pressure damping device) according to the third embodiment includes a first cylinder 11 (a cylinder) which houses oil (a fluid), a piston rod 21 (a rod) which has a one side-end housed in the first cylinder 11 and the other side-end protruding from an opening of the first cylinder 11 and which moves in the axial direction of the first cylinder 11, and a bottom valve section 360 (a damping force generating unit) which generates a damping force by a movement of the piston rod 21. In addition, the bottom valve section 360 includes a valve body 330 (a flow channel formation section) in which is formed an extension side bottom oil channel 612 (a flow channel) through which oil flows in conjunction with a movement of the piston rod 21, a base valve 352 (an opening/closing member) which opens and closes the extension side bottom oil channel 612 of the valve body 330, a ring-shaped ring valve 53 (an annular member) which is provided on an opposite side to a side opposing the valve body 330 of the base valve 352, and a preload spring 54 (a protruding member) which extends radially and which has a positioning section 542 (a positioning section) that determines a position of the ring valve 53 in the radial direction.

As shown in FIG. 11, the hydraulic damping device 1 according to the third embodiment includes a piston section 91 in place of the piston section 100 according to the first embodiment and includes a bottom valve section 360 in place of the bottom valve section 60 according to the first embodiment. In addition, the hydraulic damping device 1 according to the third embodiment includes a solenoid valve section 93 which generates a damping force in conjunction with a movement of the piston section 91 in the axial direction.

Furthermore, the first cylinder 11 according to the third embodiment forms a cylinder opening 11H on the other side together with a groove formed on the rod guide 14. A second cylinder 12 is a thin-walled cylindrical member. In addition, the second cylinder 12 is on the outer side of the first cylinder 11, and a communication channel L that constitutes a pathway of oil between the first oil chamber Y1 and the second oil chamber Y2 is formed between the second cylinder 12 and the first cylinder 11. A third cylinder 17 is on the outer side of the first cylinder 11, and a reservoir chamber R that stores oil is formed between the third cylinder 17 and the second cylinder 12.

The piston section 91 is attached to a one side-end of the piston rod 21. In addition, with movements of the piston rod 21 on the one side and on the other side, the piston section 91 generates flows of oil between the first oil chamber Y1 and the second oil chamber Y2 and between the first oil chamber Y1 and the reservoir chamber R.

The bottom valve section 360 shares a basic configuration with the piston section 100 according to the first embodiment. Furthermore, the bottom valve section 360 is provided at one side-ends of the first cylinder 11 and the second cylinder 12.

Moreover, in the bottom valve section 360, the base valve 352 is formed in a disc shape without any oil holes.

The solenoid valve section 93 throttles a flow of oil having flowed in via the communication channel L in conjunction with a movement of the piston section 91. Subsequently, the solenoid valve section 93 discharges the oil to the reservoir chamber R. Moreover, the solenoid valve section 93 is capable of varying a throttle amount of the flow of oil and changing generated damping force using a solenoid mechanism (not shown).

With the hydraulic damping device 1 according to the third embodiment which is configured as described above, oil between the first oil chamber Y1 and the reservoir chamber R circulates in the bottom valve section 360 in conjunction with a movement of the piston section 91. In addition, even in the third embodiment, the preload spring 54 presses the ring valve 53 toward the base valve 352 with the pressing sections 541. In particular, the preload spring 54 imparts force via the ring valve 53 when the base valve 352 attempts to close a flow channel of oil and acts so as to immediately close the base valve 352. Furthermore, the preload spring 54 determines a position of the ring valve 53 in the radial direction with the positioning section 542.

Moreover, while the hydraulic damping device 1 according to the first embodiment (first to third modifications) and the second embodiment described above has a so-called double-tube structure, the structure of the hydraulic damping device 1 is not limited thereto. For example, the hydraulic damping device 1 according to the first embodiment (first to third modifications) and the second embodiment may have a triple-tube structure.

In addition, the bottom valve section 60 according to the first embodiment (first to third modifications) and the piston section 91 according to the third embodiment are not limited to the structures described in the embodiments above and may have other shapes and configurations as long as functions as a damping mechanism are provided.

Furthermore, the structures according to the first to third modifications may be applied to the bottom valve section 260 according to the second embodiment or to the bottom valve section 360 according to the third embodiment.

Furthermore, for example, while the preload spring 54 according to the first embodiment is configured to determine a position of the ring valve 53 in the radial direction using the positioning section 542 that is in contact with the inner circumference of the ring valve 53, this configuration is not restrictive. For example, the preload spring 54 may determine a position of the ring valve 53 in the radial direction while being in contact with the outer circumference of the ring valve 53. This similarly applies to the other modifications and embodiments.

Moreover, the extension side slit valve 41 and the compression side slit valve 51 according to the first embodiment (first to third modifications), the second embodiment, and the third embodiment are not essential components.

In addition, for example, with respect to the pressing sections 541 and the positioning sections 542 of the preload spring 54 according to the first to third embodiments, the pressing sections 741 and the positioning sections 742 of the preload spring 74 according to the first modification, the pressing sections 811 of the second preload spring 81 and the positioning sections 821 of the positioning ring 82 according to the second modification, and the pressing positioning section 841 of the third preload spring 84 according to the third modification, the shapes, the numbers, and the intervals of adjacency of the respective sections are not limited to the contents described above and other configurations may be adopted.

What is claimed is:

1. A pressure damping device, comprising:
   a cylinder that houses a fluid;
   a rod that has a one side-end housed in the cylinder and the other side-end protruding from an opening of the cylinder and that moves in an axial direction of the cylinder; and
   a damping force generating unit that generates a damping force by a movement of the rod, wherein
   the damping force generating unit includes:
   a flow channel formation section that is formed with a flow channel through which the fluid flows in conjunction with the movement of the rod;
   an opening/closing member that opens and closes the flow channel in the flow channel formation section;
   a ring-shaped annular member that is provided on the opening/closing member at an opposite side to a side that opposes the flow channel formation section; and
   a protruding member that has a positioning section that extends in a radial direction of the cylinder such that an end of the positioning section contacts an inner circumferential surface of the annular member, wherein
   the positioning section determines a position of the annular member in the radial direction,
   the protruding member includes a pressing section that extends in the radial direction and presses the annular member toward the opening/closing member, and
   a protrusion length of the positioning section in the radial direction is shorter than a protrusion length of the pressing section in the radial direction.

2. The pressure damping device according to claim 1, wherein the flow channel formation section includes a first flow channel section that forms a flow of the fluid flowing from one side to the other side in an axial direction and a second flow channel section that forms a flow of the fluid flowing from the other side to the one side in the axial direction, and
   wherein the opening/closing member is provided on the other side of the flow channel formation section, and includes
   a cover section that opens and closes the other side of the first flow channel section, and
   an opening section that opens the other side of the second flow channel section.

3. The pressure damping device according to claim 1, wherein the annular member circumferentially surrounds the positioning section.

4. An elastic member facing toward an annular member used in a pressure damping device that generates a damping force in conjunction with a movement of a rod relative to a cylinder, the elastic member comprising:
   an annular section that has a through-hole through which the rod penetrates;
   a plurality of first protruding sections that extends from the annular section in a radial direction of the cylinder; and
   a second protruding section that extends from the annular section in the radial direction and has a shorter protrusion length in the radial direction than the first protruding sections, wherein
   an end of the second protruding section contacts an inner circumferential surface of the annular member.

5. The pressure damping device according to claim 4, wherein a distal end of the second protruding section comprises a continuously curved surface.

* * * * *